2,887,467

REACTING ETHYLENE GLYCOL WITH METHYLSILSESQUIOXANE TO FORM WATER-SOLUBLE PRODUCT

Karl W. Krantz, Schenectady, N.Y., assignor to General Electric Company, a corporation of New York No Drawing. Application February 3, 1958
Serial No. 712,616

2 Claims. (Cl. 260—46.5)

This invention is concerned with a process for making glycol substituted organosiloxanes of low molecular weight. More particularly, the invention relates to a process for converting a water-insoluble, non-water-dispersible methylpolysiloxane (also identified in the literature as "methylsilsesquioxane") having the formula $$(CH_3SiO_{3/2})_n$$

to a water-soluble glycoxy derivative of methylsilsesquioxane having a lower molecular weight than the starting methylpolysiloxane where $n$ is a whole number greater than 1, e.g., from 100 to 100,000 or more, which process comprises effecting reaction in the absence of a catalyst and of added water between the above-identified methylpolysiloxane and ethylene glycol at a temperature above 150° C. but below the decomposition point of the reactants or the reaction products.

Highly cross-linked methylpolysiloxanes (gels) obtained by the hydrolysis and subsequent condensation to the gel state of methyltrichlorosilane are often obtained as waste material or may be produced intentionally in order to better store such materials for subsequent use. A good example of such highly cross-linked materials are the highly cross-linked gels obtained by hydrolyzing methyltrichlorosilane and condensing it to the silsesquioxane state of the formula $$[CH_3SiO_{3/2}]_n$$

where $n$ is a whole number greater than 1. Such cross-linked methylpolysiloxanes are readily stored without requiring undue precautions for such storage as would be required when storing, for instance, the starting monomer, namely, the methyltrichlorosilane from which such silsesquioxanes are prepared. These methylsilsesquioxanes can be converted to intermediate products particularly for water-repellent purposes by reacting them with highly concentrated aqueous alkali-metal hydroxide solutions to give compositions composed essentially of alkali-metal salts of the methylsilanetriol which have advantageously been employed as water-repellents in the manner more particularly described in Elliott and Krieble Patent 2,507,200 issued May 9, 1950, and assigned to the same assignee as the present invention. However, it has been found difficult and hazardous to use these alkali-metal salts of the methylsilanetriol because of their extreme alkalinity. In addition, it is difficult to use these alkaline monomeric materials for making other organopolysiloxanes.

Unexpectedly, I have discovered that I can react these highly cross-linked methylpolysiloxanes with ethylene glycol at a temperature of about 150° C. while simultaneously removing the evolved water to give water-soluble glycoxy derivatives of lower molecular weight than the initial cross-linked methylpolysiloxane used. This process surprisingly requires no catalyst, no organic solvent, nor water, and the resulting products thus obtained are water-soluble in all proportions. In this form the glycoxy derivatives can be used in applications similar to those for which the alkali-metal salt of methylsilanetriol can be used, e.g., as water-repellents.

The proportion of methylpolysiloxane to ethylene glycol used may be varied widely. Advantageously, there should be present as a minimum at least three mols of the glycol per mol of silicon atoms of the starting methylpolysiloxane. The use of a molar excess of the glycol over the methylpolysiloxane, that is, for from 4 to 30 mols or more of the glycol per silicon atom of the methylpolysiloxane, is particularly desirable in order to obtain greater yields of the formed water-soluble methylpolysiloxane, and to accelerate the reaction to the water-soluble state.

In carrying out the reaction, the methylpolysiloxane and the ethylene glycol are mixed together and heated at a temperature of from about 150° C. to below the decomposition point of the reactants or the formed reaction product. I have found that temperatures ranging from about 150° to 300° C. for times ranging from about 1 to 30 hours or more are usually adequate for the purpose. Where temperatures above the reflux temperature of ethylene glycol (about 198° C.) are used, it may be necessary to employ pressure equipment. During the heating, the formed water is removed by means of a conventional take-off head. Although mechanical stirring is often not required, agitation may be employed in order to assist the reaction. The reaction product can be suitably isolated to give the desired water-soluble glycoxy derivative.

In order that those skilled in the art may better understand how the present invention may be practiced, the following example is given by way of illustration and not by way of limitation. All parts are by weight.

*Example*

Methyltrichlorosilane was hydrolyzed with water (similarly as that shown in the above-mentioned U.S. Patent 2,507,200), neutralized and washed with water to remove traces of HCl, and thereafter dried in an air-circulating oven at 120° C. for about 17 hours. About 22.3 parts of this dried methylsilsesquioxane (0.33 mol calculated as $CH_3SiO_{1.5}$) and 372 parts (6.0 mols) ethylene glycol were mixed together in a flask having a Vigreux column with conventional take-off and condenser. The system was protected by a calcium chloride drying tube. Heat was applied and the mixture of ingredients was heated and distillate was removed periodically at varying head temperatures between 100° and 197° C. During the early part of the heating, that is, in periods of total reflux, the head temperature tended to fall, indicating a gradual evolution of water. However, the over-all range of pot temperature was about 188° at the beginning of the take-off of the water to a final pot temperature of 199° C. After about seven hours, heating at 188° to 199° C., the methylpolysiloxane gel which had gone into solution in the ethylene glycol was decreasing in viscosity and after 21 hours of heating at the above temperature, essentially all the methylpolysiloxane gel was in solution. About 10.8 parts of the distillate was collected and this corresponded on a weight basis to about 65 percent water and about 35 percent ethylene glycol. After 24 hours total heating, the reaction product was cooled and filtered. The filtrate (i.e., the glycol-methylpolysiloxane adduct) which was a straw colored liquid, was obtained in a weight equal to about 52.5 parts and was found to be miscible in all proportions with water.

This reaction product was analyzed by dissolving it in a large excess of water, e.g., a 20 molar excess of water, and evaporating this solution to dryness followed by baking this residue at 150° C. for 1½ hours. There was obtained a solid residue comprising cross-linked methylsilsesquioxane, comparable in composition with the starting methylpolysiloxane, to the extent of 5.83 percent of the filtrate. This corresponds to about 20.47 parts of the original methylpolysiloxane gel now in a water solution form. The addition of further amounts of the glycol adduct recovered from the filter cake to the isolated glycol adduct showed a conversion of the original methylpolysiloxane gel to the soluble glycol adduct equal to at least 73 percent.

It will, of course, be apparent to those skilled in the art that the molar concentrations of the ingredients, as well as the temperatures and times of heating, can also be varied as is more particularly recited above.

The water-soluble methylpolysiloxane-glycol adducts obtained in accordance with the process of the present invention have many uses. In particular, they can be employed in the form of water solutions thereof for rendering various surfaces water-repellent. Thus, the methylpolysiloxane-ethylene glycol adduct described in Example 1 above can be dissolved in water to a concentration of about 3 to 5 percent solids and thereafter applied to various surfaces, particularly masonry, and allowed to dry to render the surfaces water-repellent.

By using the above glycol adduct of the methylpolysiloxane, for rendering the masonry water-repellent, one is able to avoid the hazardous alkalinity attending the use of aqueous solutions of the sodium salt of methylsilanetriol for rendering masonry water-repellent. Moreover, due to the fact that there is no alkali metal ion present in the treating solution, there is much less tendency, particularly of brick masonry, to effloresce or whiten on the surface as occurs when employing the sodium salt of methylsilanetriol.

What I claim as new and desire to secure by Letters Patent of the United States is:

1. The process for converting a water-insoluble, non-water-dispersible methylsilsesquioxane to a water-soluble glycoxy derivative of methylsilsesquioxane having a lower molecular weight than the starting methylsilsesquioxane, which process comprises effecting reaction in the absence of a catalyst and of added water between the starting methylsilsesquioxane and at least 3 mols of ethylene glycol per mol of silicon atoms of the starting methylsilsesquioxane at a temperature above 150° C. but below the decomposition point of the reactants and the reaction products, said reaction being carried out under such conditions that the water formed during the reaction is removed.

2. The process as in claim 1 in which there are employed from 4 to 30 mols of the ethylene glycol per mol of silicon atoms in the starting methylsilsesquioxane.

No references cited.